(12) United States Patent
Nissen et al.

(10) Patent No.: US 11,691,753 B2
(45) Date of Patent: Jul. 4, 2023

(54) SYSTEMS AND METHODS FOR AERIAL AIRCRAFT RESUPPLY

(71) Applicant: Bell Textron Inc., Fort Worth, TX (US)

(72) Inventors: Jeffrey Paul Nissen, Arlington, TX (US); Troy Cyril Schank, Keller, TX (US); Brent Chadwick Ross, Flower Mound, TX (US); Steven Ray Ivans, Ponder, TX (US)

(73) Assignee: Textron Innovations Inc., Providence, RI (US)

( * ) Notice: Subject to any disclaimer, the term of this patent is extended or adjusted under 35 U.S.C. 154(b) by 27 days.

(21) Appl. No.: 17/095,634

(22) Filed: Nov. 11, 2020

(65) Prior Publication Data
US 2021/0139161 A1 May 13, 2021

Related U.S. Application Data

(60) Provisional application No. 62/933,648, filed on Nov. 11, 2019.

(51) Int. Cl.
*B64D 39/04* (2006.01)
*B64D 7/00* (2006.01)
*B64D 39/02* (2006.01)

(52) U.S. Cl.
CPC ............ *B64D 39/04* (2013.01); *B64D 7/00* (2013.01); *B64D 39/02* (2013.01)

(58) Field of Classification Search
CPC .......... B64D 39/02; B64D 39/04; B64D 7/00; B64D 1/04; B64D 1/22
See application file for complete search history.

(56) References Cited

U.S. PATENT DOCUMENTS

| | | | | |
|---|---|---|---|---|
| 2,879,017 A | * | 3/1959 | Smith | B64D 39/02 244/135 A |
| 2,949,265 A | * | 8/1960 | Person | B64D 39/04 244/135 A |
| 3,167,278 A | * | 1/1965 | Roberge | B64D 1/22 89/1.816 |
| 5,103,712 A | * | 4/1992 | Minovitch | B64D 1/00 198/804 |
| 7,059,569 B1 | * | 6/2006 | Beyerle | F41A 9/82 244/137.1 |
| 2006/0202088 A1 | * | 9/2006 | Padan | B64D 1/00 244/137.1 |
| 2007/0040065 A1 | * | 2/2007 | Von Thal | B64D 39/04 244/135 A |
| 2007/0084968 A1 | * | 4/2007 | Thal | B64D 39/00 244/135 A |

(Continued)

FOREIGN PATENT DOCUMENTS

WO WO-2020084291 A1 * 4/2020 ............. B64D 39/04

*Primary Examiner* — Joshua J Michener
*Assistant Examiner* — Ka Chun Leung
(74) *Attorney, Agent, or Firm* — Lightfoot & Alford PLLC

(57) ABSTRACT

An aerial resupply system (ARS) including a supply aircraft. The supply aircraft includes at least one of supply fuel, an ordinance, and data. The supply aircraft also includes a retractable boom system (RBS) configured for selective stowage within a fuselage of the supply aircraft and configured to supply at least one of supply fuel, the ordinance, and data to a location external to the fuselage.

8 Claims, 21 Drawing Sheets

(56) References Cited

U.S. PATENT DOCUMENTS

| | | | |
|---|---|---|---|
| 2017/0233092 A1* | 8/2017 | Harvey | B64D 39/02 244/135 A |
| 2018/0265212 A1* | 9/2018 | Pruzan | B64D 39/06 |
| 2019/0092487 A1* | 3/2019 | Margetis | B64D 39/06 |

* cited by examiner

SYSTEMS AND METHODS FOR AERIAL AIRCRAFT RESUPPLY

CROSS-REFERENCE TO RELATED APPLICATIONS

This patent application claims the benefit of the filing date of U.S. Provisional Patent Application Ser. No. 62/933,648, filed on 11 Nov. 2019 and entitled "SYSTEMS AND METHODS FOR AERIAL AIRCRAFT RESUPPLY," the entire content of which is hereby expressly incorporated by reference.

STATEMENT REGARDING FEDERALLY SPONSORED RESEARCH OR DEVELOPMENT

Not applicable.

BACKGROUND

It is known that it is desirable to increase a length of time that an aircraft can remain in flight without requiring a landing. Accordingly, systems have previously been developed for refueling aircraft midair. Such airborne refueling typically occurs by extending a flexible fuel line to a location behind and below an airborne supplying aircraft so that a receiving aircraft can approach a connector of the fuel line, connect to the fuel line, and receive fuel. It is also desirable to increase an aircraft's operational capability by resupplying a receiving aircraft with ordinances without the need to land the receiving aircraft.

DETAILED DESCRIPTION

Figure 1:
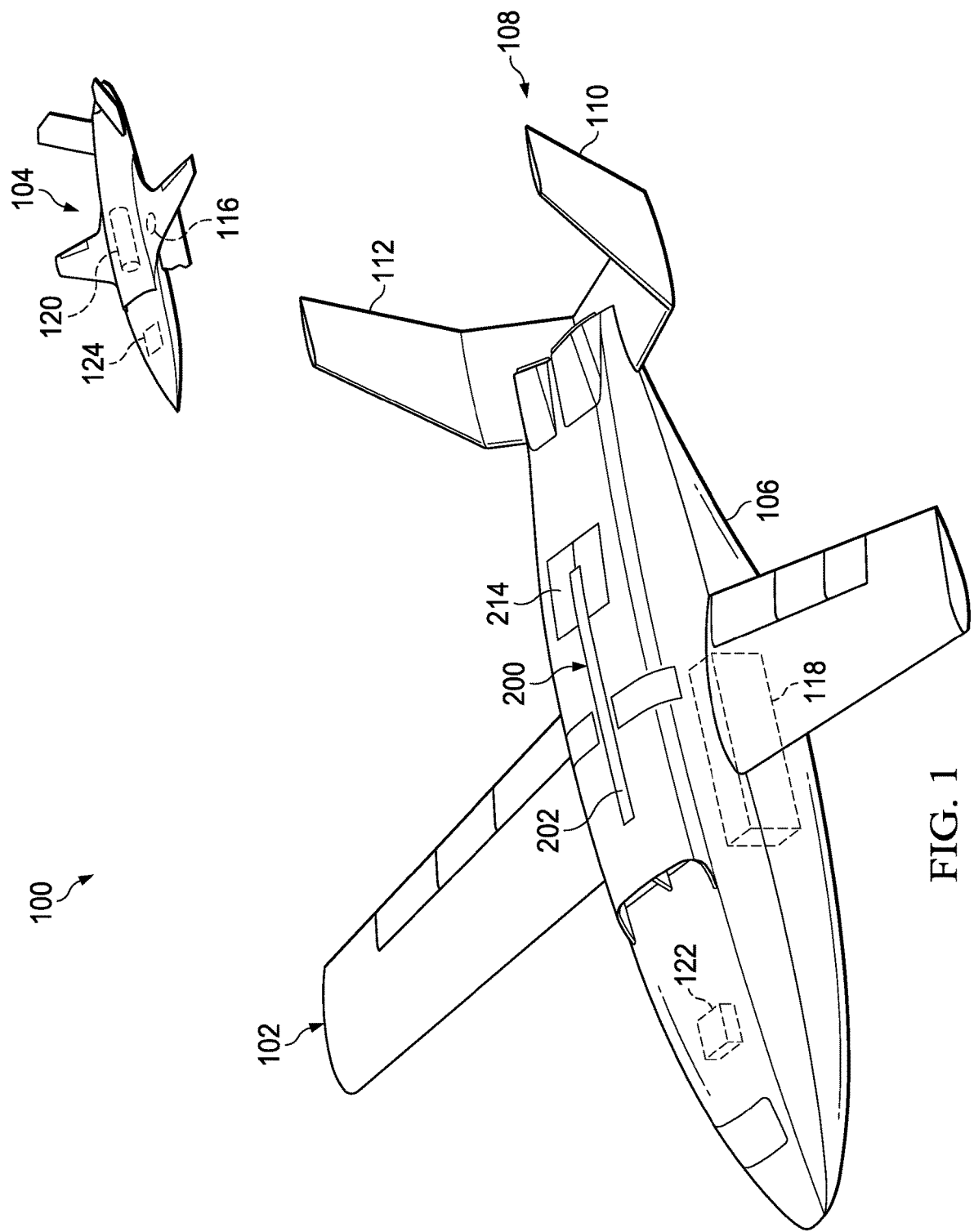
FIG. 1 is an oblique view of an aerial resupply system (ARS) according to this disclosure, with a supply aircraft in a stowed state.

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges systems and methods for resupplying a receiving aircraft with fuel and/or ordinances from a supplying aircraft. Multiple aerial resupply systems (ARSs) are disclosed herein along with multiple methods of aerial resupplying an aircraft.

FIGS. 1-10 showing aerial resupply system (ARS) 100 comprising a supply aircraft 102 and a receive aircraft 104. Most generally, FIGS. 1-10 progressively show various stages of an aerial resupply method. The supply aircraft 102 generally comprises a fuselage 106, a split tail 108 comprising first vertical portion 110 and second vertical portion 112, and a resupply boom system (RBS) 200. In this embodiment, the RBS 200 is carried by the fuselage 106 and movable relative to the fuselage 106. More specifically, the RBS 200 comprises a substantially rigid portion 202 rotatably attached to the fuselage 106, a flexible conduit 204 that is selectively extendable from the rigid portion 202, an ordinance supply rack 206 carried by the rigid portion 202, and an actuatable wing 208 carried by the rigid portion.

Referring to FIG. 1, the ARS 100 can be utilized to resupply a receive aircraft 104 with fuel and/or ordinances from a supply aircraft 102 by initially navigating the receive aircraft 104 to a position generally higher than the supply aircraft 102 and behind the supply aircraft 102. As shown, the ARS 100 is in a stowed state so that the supply aircraft 102 houses the RBS 200 within the fuselage 106 and/or substantially flush with the fuselage 106. In this configuration, ordinance supply doors 114 remain closed.

Figure 2:
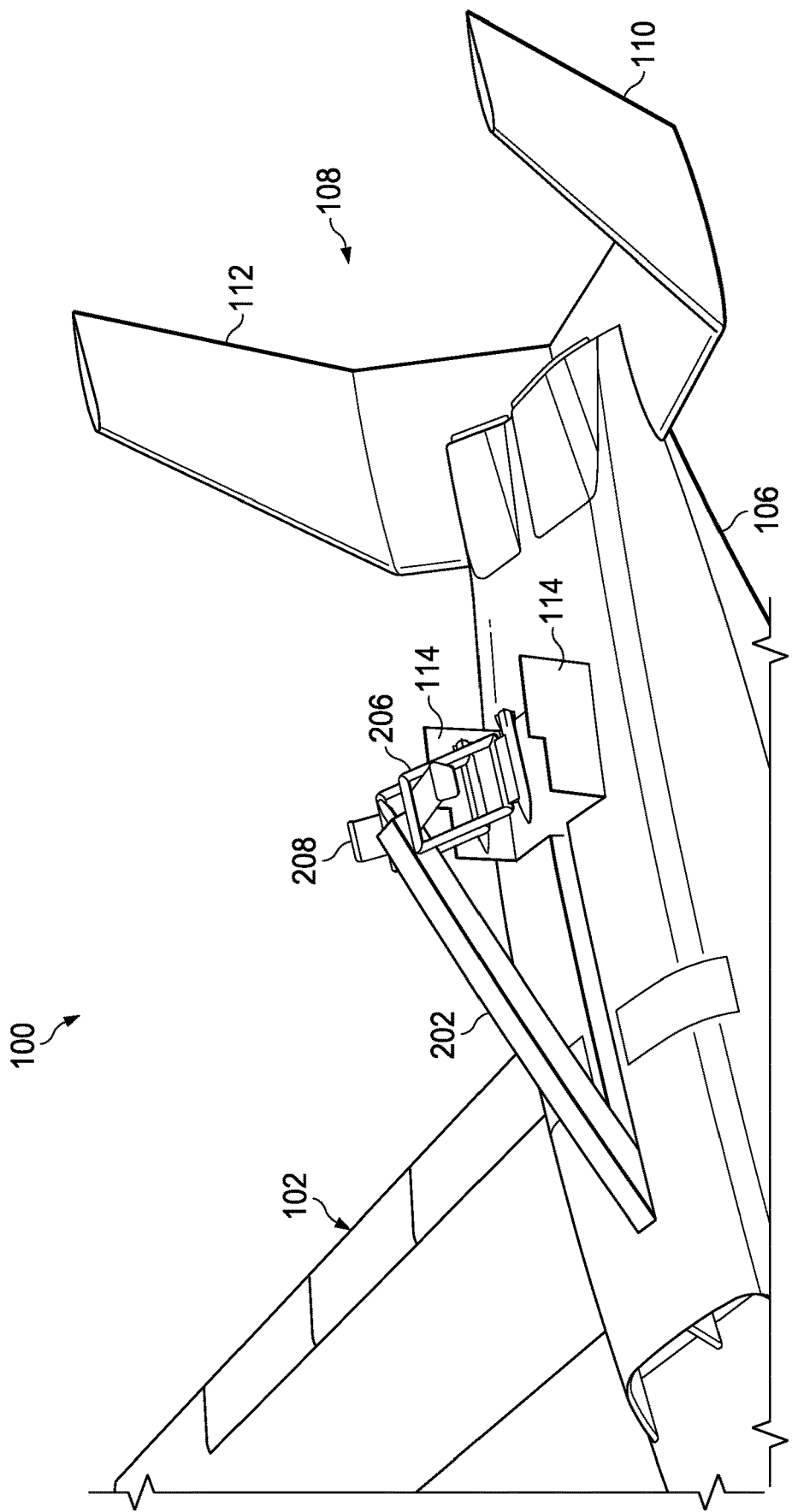
FIG. 2 is a partial oblique view of a supply aircraft of the ARS of FIG. 1 in a deployment state.

Referring to FIG. 2, with the receive aircraft 104 within close proximity of the supply aircraft 102, the RBS 200 may be actuated to extend from the fuselage 106. In this process, ordinance supply doors 114 are opened to allow removal of the ordinance supply rack 206 from the fuselage 106. While the rigid portion 202 generally provides the desired aerodynamic exterior fuselage 106 surface while the RBS 200 is stowed, the rotation of the rigid portion 202 away from the fuselage 106 may leave a slot or other channel exposed to external airflow. In alternative embodiments, fairings and/or sliding doors may be utilized to reseal the fuselage 106 while the rigid portion 202 is extended from the fuselage 106. As the wing 208 enters the airstream above the fuselage 106, the wing 208 may be actively controlled to generate lift which serves to power the rotation of the rigid portion 202 away from the fuselage 106. In some embodiments the rotation of the rigid portion 202 may be assisted by motors and/or actuators housed within the fuselage 106. It is important to note that the wing 208 is coupled relative to the ordinance supply rack 206 so that the wing 208 not only provides desired lift but also maintains a desired and predetermined orientation of the ordinance supply rack 206 relative to the airstream above the fuselage 106 throughout the entirety of the presence of the ordinance supply rack 206 exterior to the fuselage 106.

Figure 3:
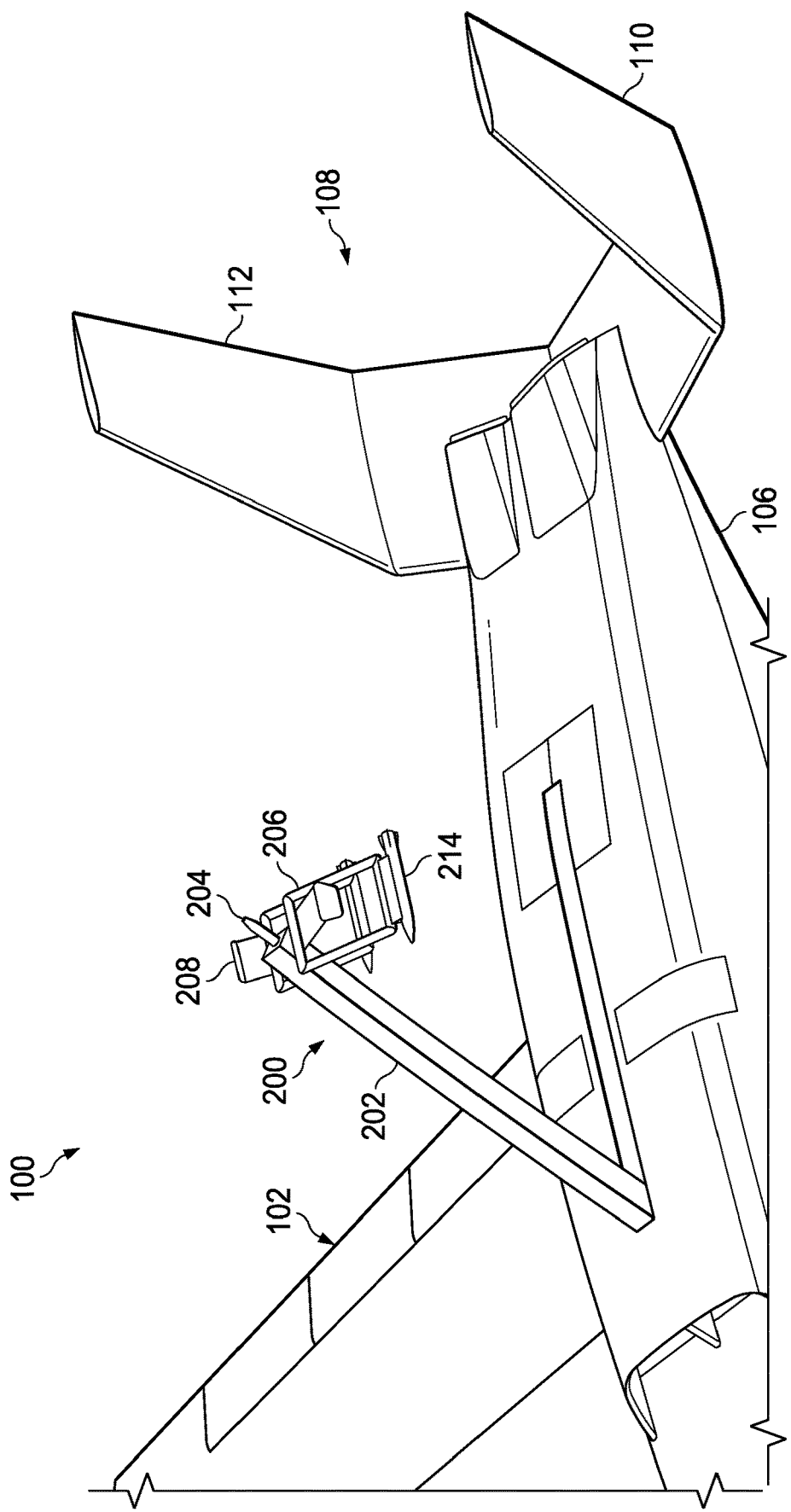
FIG. 3 is a partial oblique view of the supply aircraft of the ARS of FIG. 1 in a retracted state.

Referring to FIG. 3, once the rigid portion 202 is rotated away from the fuselage 106, and the ordinance supply rack 206 is fully removed from the fuselage 106, ordinance supply doors 114 can be closed to prevent undesirable aerodynamic drag.

Figure 4:
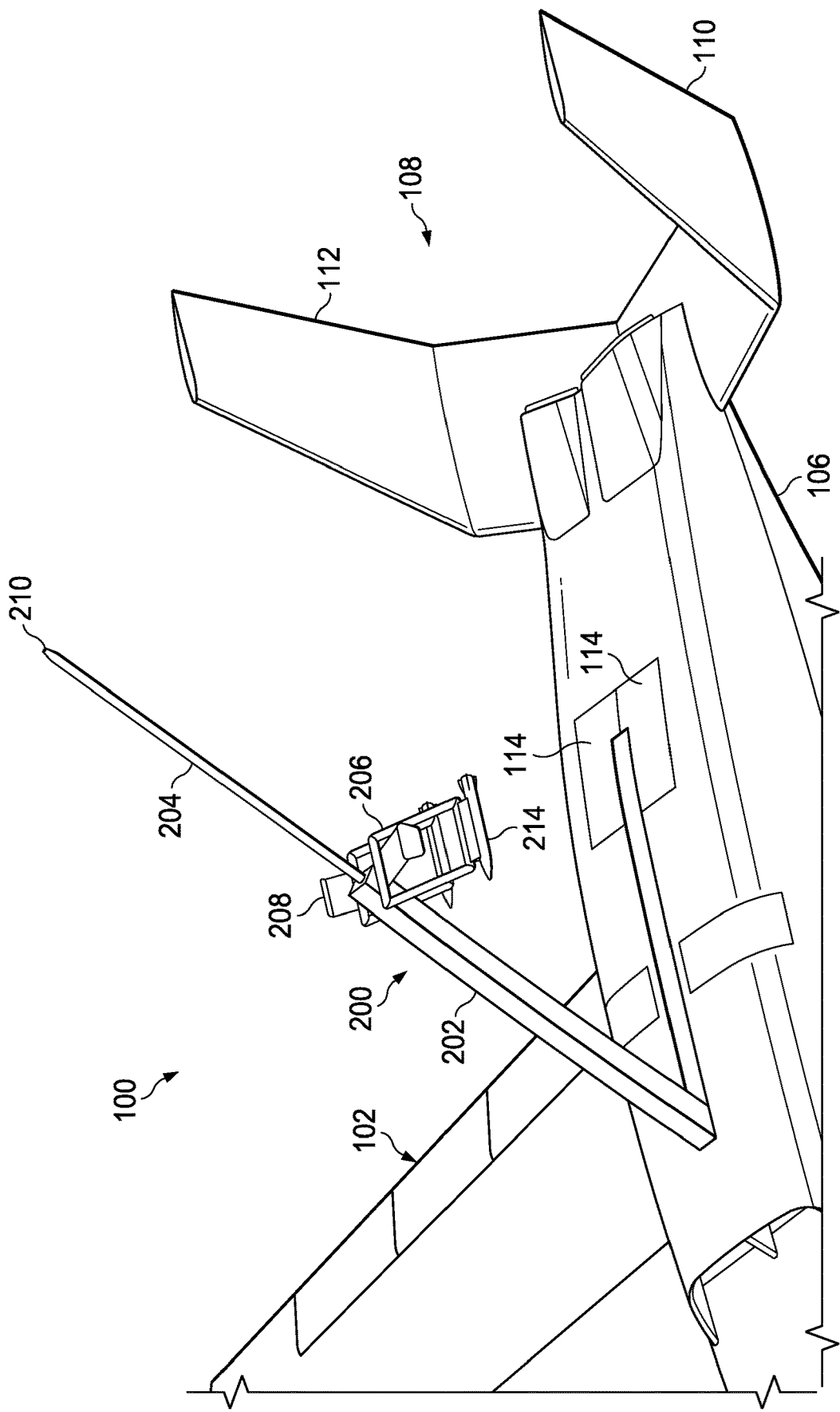
FIG. 4 is a partial oblique view of the supply aircraft of the ARS of FIG. 1 in an extended state.

Referring to FIG. 4, the flexible conduit 204 can be extended from the rigid portion 202.

Figure 5:
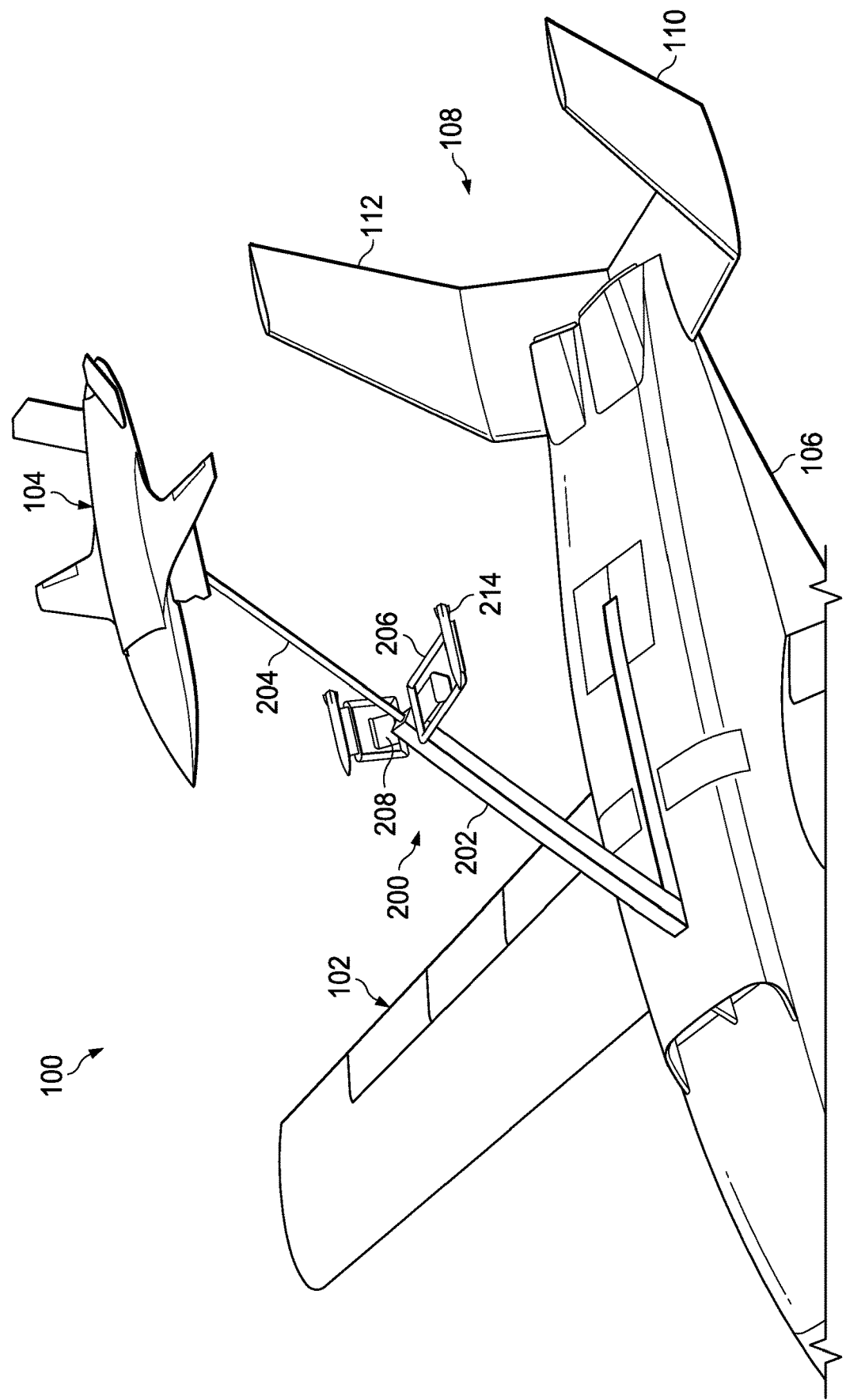
FIG. 5 is a partial oblique view of the ARS of FIG. 1 in a connected state.

Referring to FIG. 5, the receive aircraft 104 can be maneuvered relative to a connector 210 of the flexible conduit 204 so that the connector 210 is received by complementary connector 116 of the receive aircraft 104. In this embodiment, the flexible conduit 204 is configured to make a fluid connection between a fuel supply 118 of the supply aircraft 102 and a fuel receive reservoir 120 of the receive aircraft 104. Additionally, and this embodiment, the flexible conduit 204 carries electrical wiring configured to connect and communicate to the receiver aircraft flight control computer (FCC) 122 and at least one of a location sensor 212 carried by the RBS 200 and a FCC 124 of the supply aircraft 102. With the connection between the connector 210 and the complementary connector 116 made, fuel may begin being pumped vertically upward from the fuel supply 118 to the fuel receive reservoir 120. During the above-described fuel transfer, the ordinance supply rack 206 can be actuated from an initial state where the ordinances 214 carried by the ordinance supply rack 206 are at vertical locations that overlap vertical locations of the rigid portion 202 to vertical locations vertically higher than the rigid portion 202.

Figure 6:
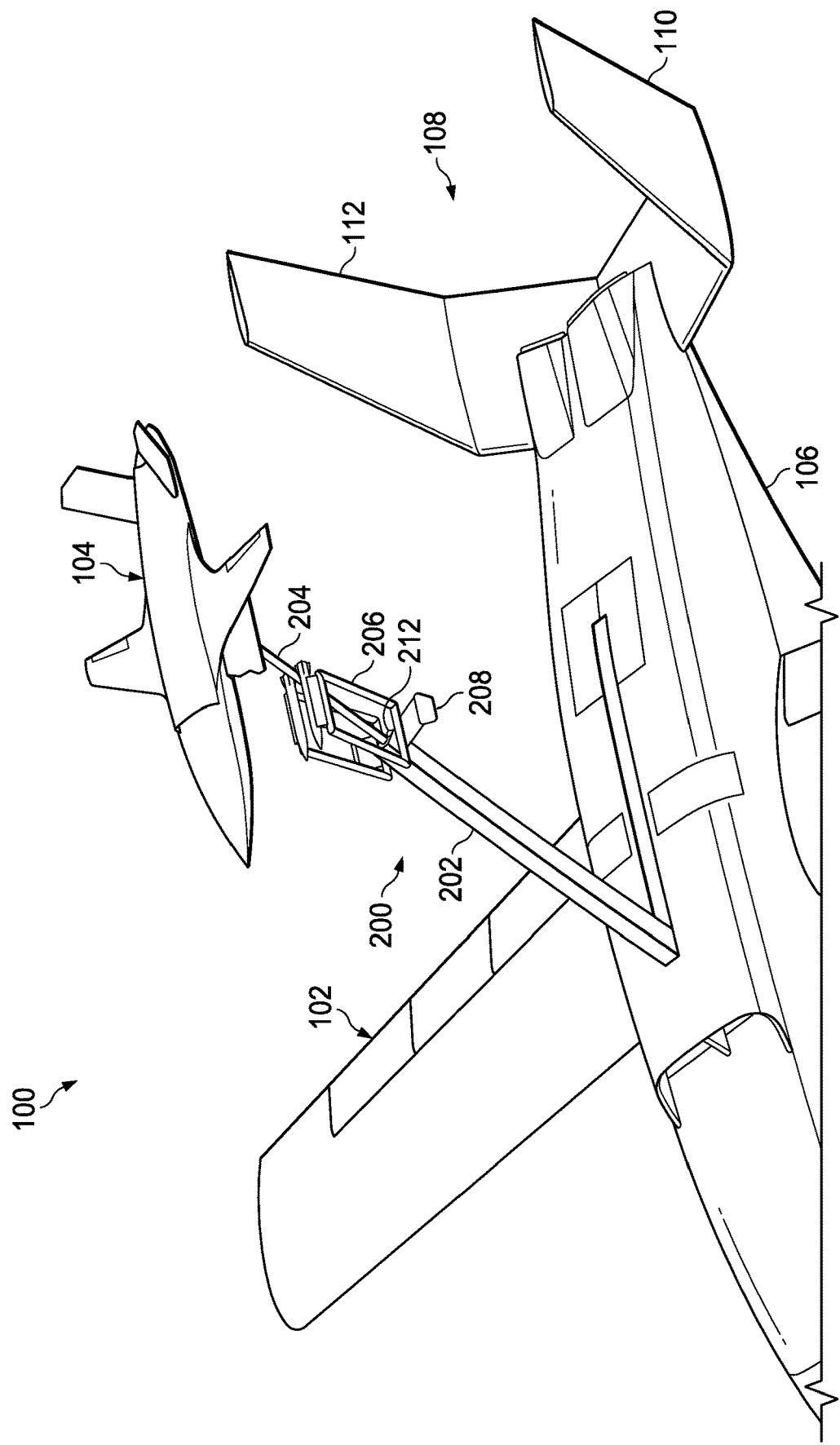
FIG. 6 is a partial oblique view of the ARS of FIG. 1 in an ordinance pre-positioned state.

Referring to FIG. 6, the ordinance supply rack 206 can further be actuated into a pre-positioned state selected to allow insertion of the ordinances 214 and a portion of the ordinance supply rack 206 into a bay 125 of the receive aircraft 104. With the ordinance supply rack 206 in the pre-positioned state described above, relative location data specific to the location of the RBS 200 and the receive aircraft 104 can be provided from the location sensors 212 to the FCC 122 and the FCC 122 can utilize the data to maneuver the receive aircraft 104 closer to the ordinances 214. During such reduction of distance between the ordinances 214 and the receive aircraft 104, unnecessary length in the flexible conduit 204 can be retracted through the rigid portion 202.

Figure 7:
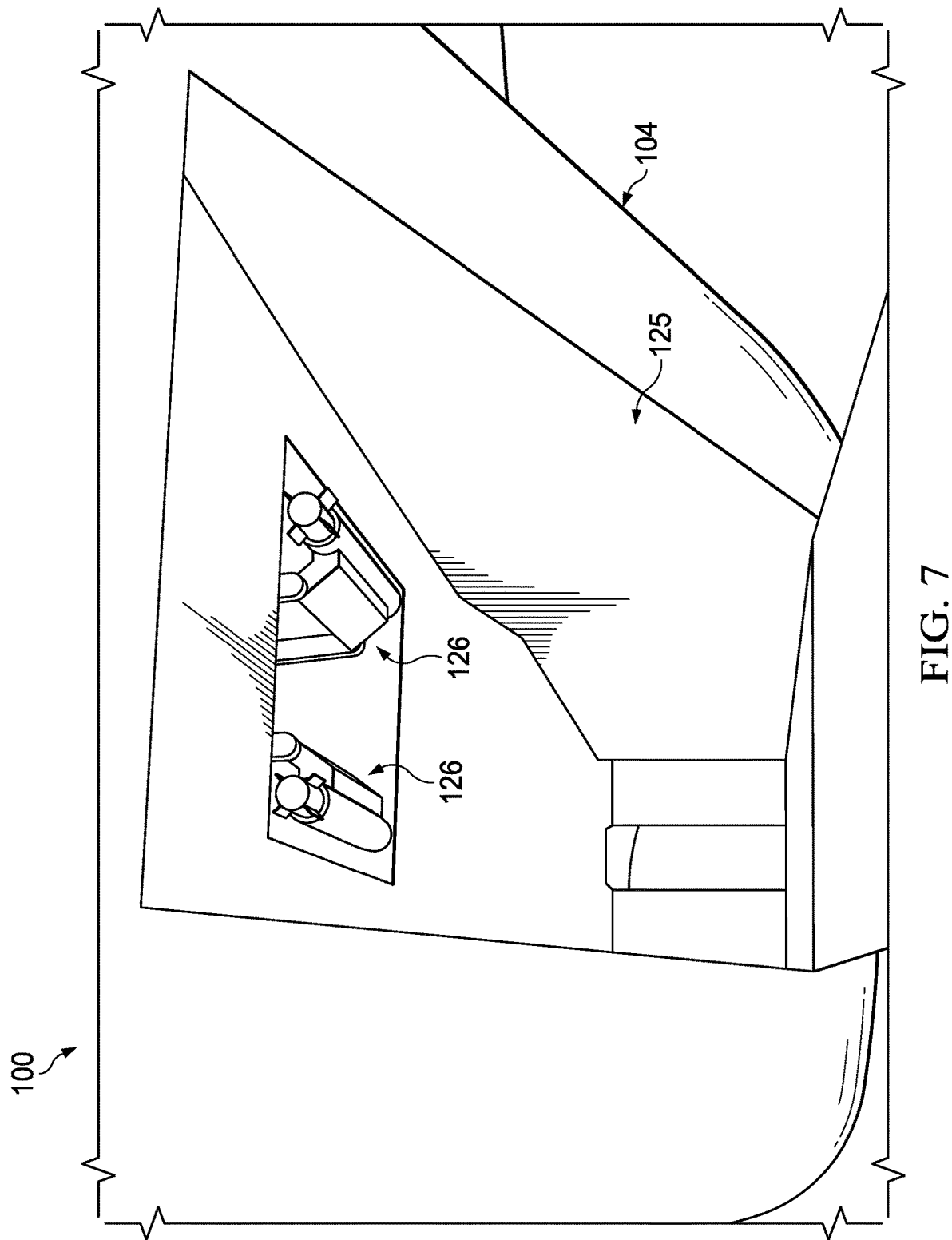
FIG. 7 is a partial oblique view of a receive aircraft of the ARS of FIG. 1.

Referring to FIG. 7, an oblique bottom view of the bay 125 is shown.

Figure 8:
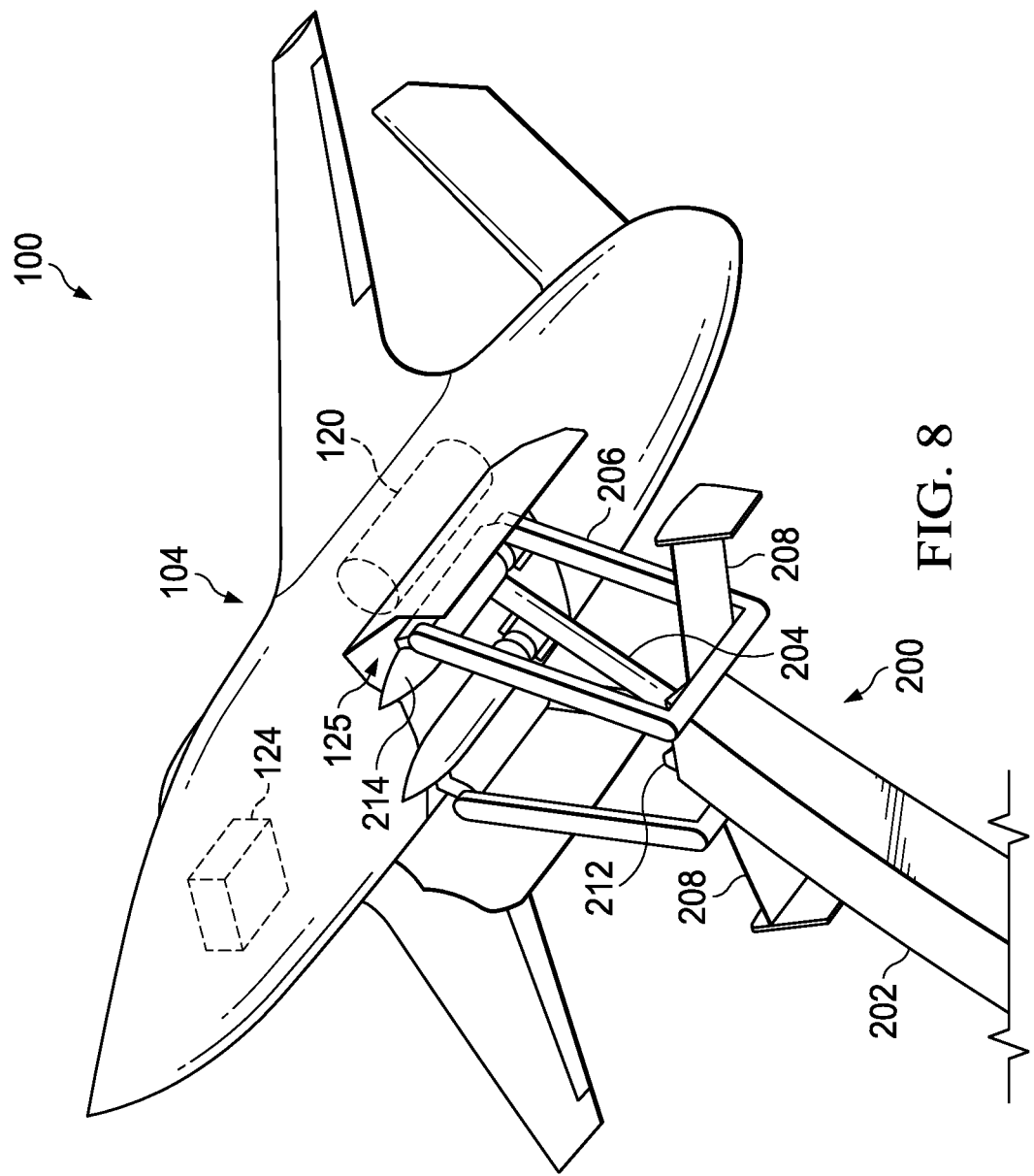
FIG. 8 is a partial oblique view of the ARS of FIG. 1 in an ordinance insertion state.

Referring to FIG. 8, an oblique bottom view of the ordinance supply rack 206 being received into the bay 125 is shown.

Figure 9:
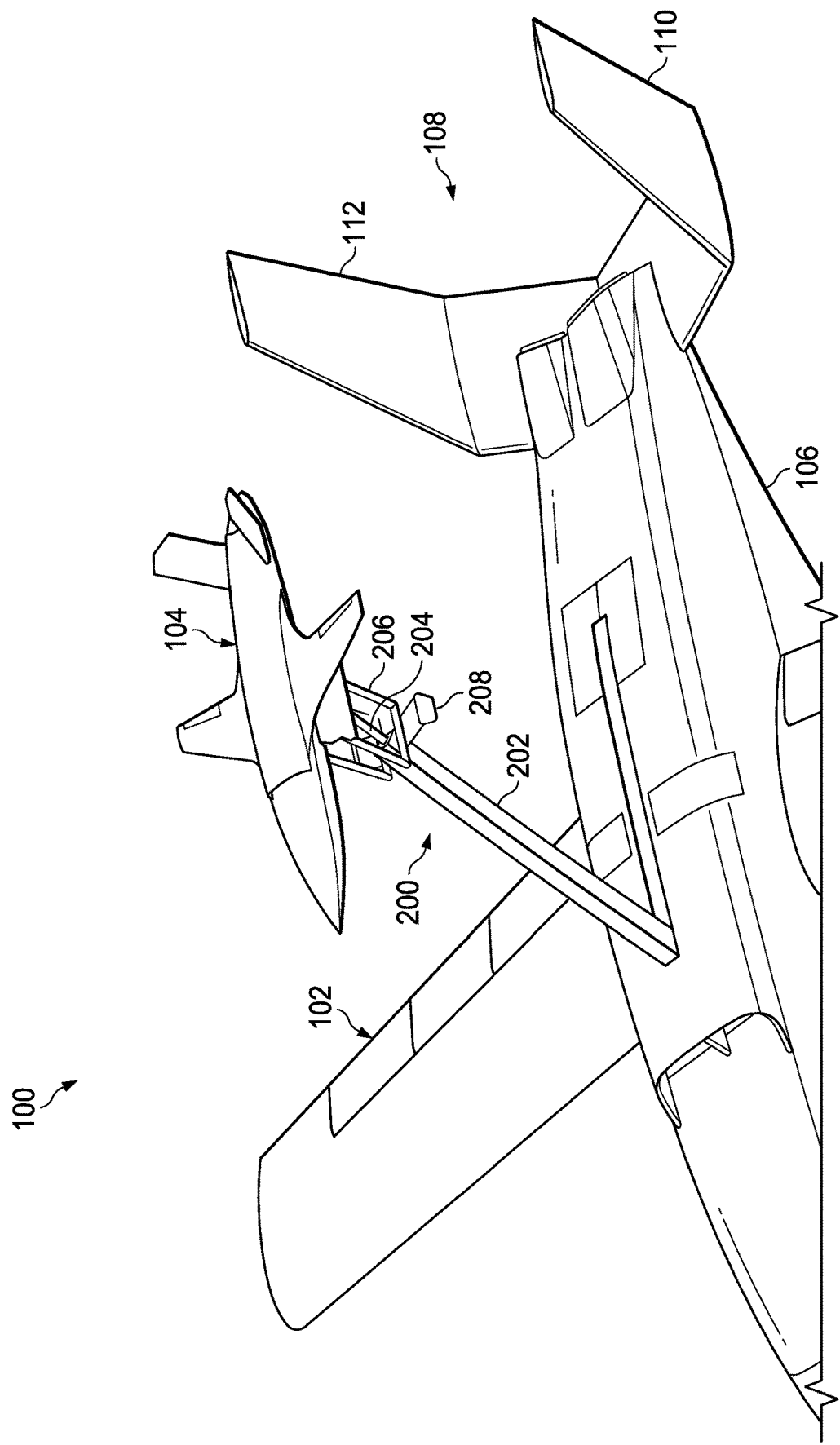
FIG. 9 is another partial oblique view of the ARS of FIG. 1 in an ordinance insertion state.

Referring to FIG. 9, the receive aircraft 104 is shown with the ordinances 214 and a portion of the ordinance supply rack 206 received within the bay 125. In this position, ordinances 214 can be transferred from the ordinance supply rack 206 to a complementary rack 126 of the receive aircraft 104. Once the ordinances 214 are received by the complementary rack 126, they may be secured using pins or other attachment means. In response to verification of a successful transfer of the ordinances 214 and in some cases completed fuel transfer, the connection between the connector 210 and the complementary connector 116 may be discontinued.

Figure 10:
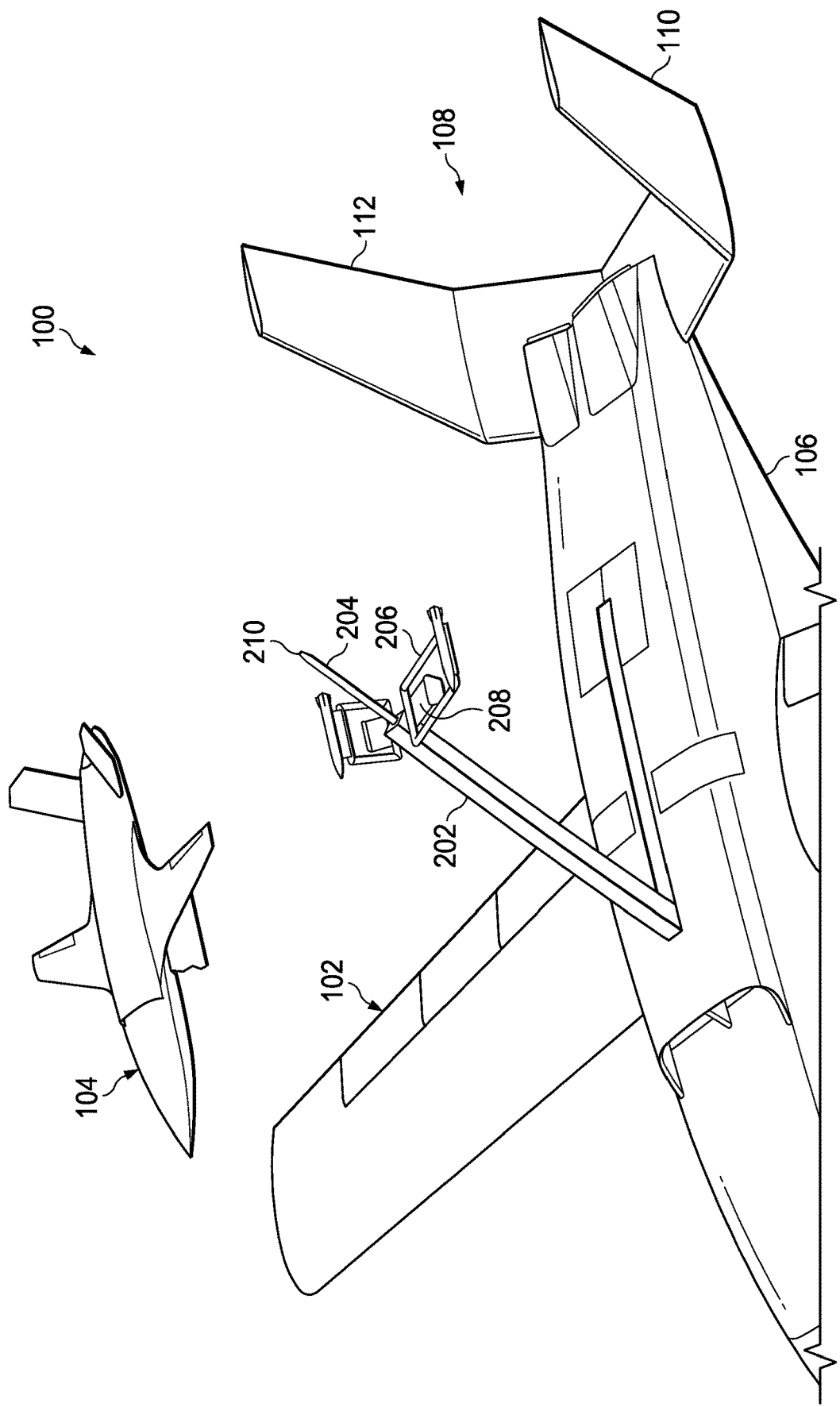
FIG. 10 is a partial oblique view of the ARS of FIG. 1 in a post resupply state.

Referring to FIG. 10, the receive aircraft 104 is shown moving away from the RBS 200 and the ordinance supply rack 206 is shown being actuated from the pre-positioned state toward the state initially shown in FIG. 2 which will allow the ordinance supply rack 206 to be moved back into the fuselage 106. Although not shown, it will be appreciated that stowage of the RBS 200 back into the fuselage 106 can be accomplished by performing the above described RBS 200 deployment steps in reverse so that upon completion, the entirety of the ordinance supply rack 206 is once again received within the fuselage 106. And the rigid portion 202 once again forms a smooth exterior portion of the fuselage 106. Once re-stowed, the ordinance supply rack 206 can be resupplied with ordinances either manually by crewmembers within the fuselage 106 or by an automated resupply system carried within the fuselage 106.

Figure 11:
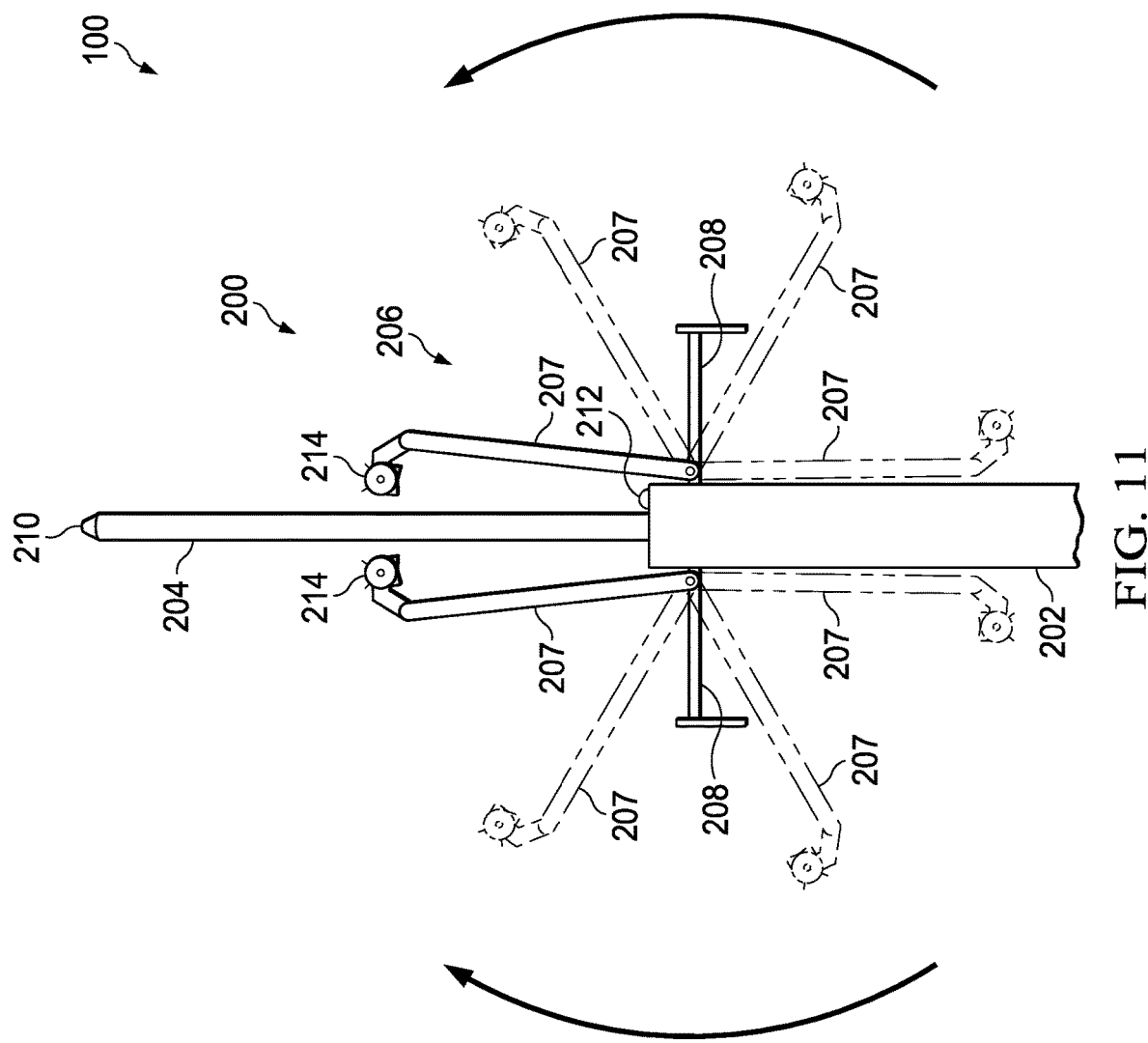
FIG. 11 is a partial front view of the supply aircraft of the ARS of FIG. 1 showing an ordinance supply rack of the supply aircraft in multiple positions, including an ordinance pre-positioned state and an ordinance pre-connection state.

Referring to FIG. 11, the RBS 200 is shown with the ordinance rack 206 in both the initial stowed position with ordinance rack arms 207 extending along the length of the rigid portion 202, extending beyond the end of the rigid portion 202, and positions in between. In alternative embodiments, and ordinance rack may be provided that comprises a mechanism such as a four bar mechanism that is configured to provide similar vertical displacement of the carried ordinances without requiring such a great lateral rotational sweep that may undesirably cause contact with bay doors of a receive aircraft. In other embodiments, ordinances may be carried by mechanisms comprising linear actuators so that ordinances may be extended beyond the rigid portion 202 without requiring any rotational sweep of ordinance rack arms.

FIGS. 12-17 showing aerial resupply system (ARS) 300 comprising a supply aircraft 302 and a receive aircraft 304. Most generally, FIGS. 12-17 progressively show various stages of an aerial resupply method. The supply aircraft 302 generally comprises a fuselage 306, a single vertical tail 308, and a resupply boom system (RBS) 400. In this embodiment, the RBS 400 is carried by the fuselage 306 and movable relative to the fuselage 306. More specifically, the RBS 400 comprises a substantially rigid portion 402 longitudinally extendable relative to the fuselage 306, a flexible conduit 404 that is selectively extendable from the rigid portion 402, an ordinance supply rack 406 carried by the rigid portion 402, and an actuatable wing 408 carried by the rigid portion 402.

Figure 12:
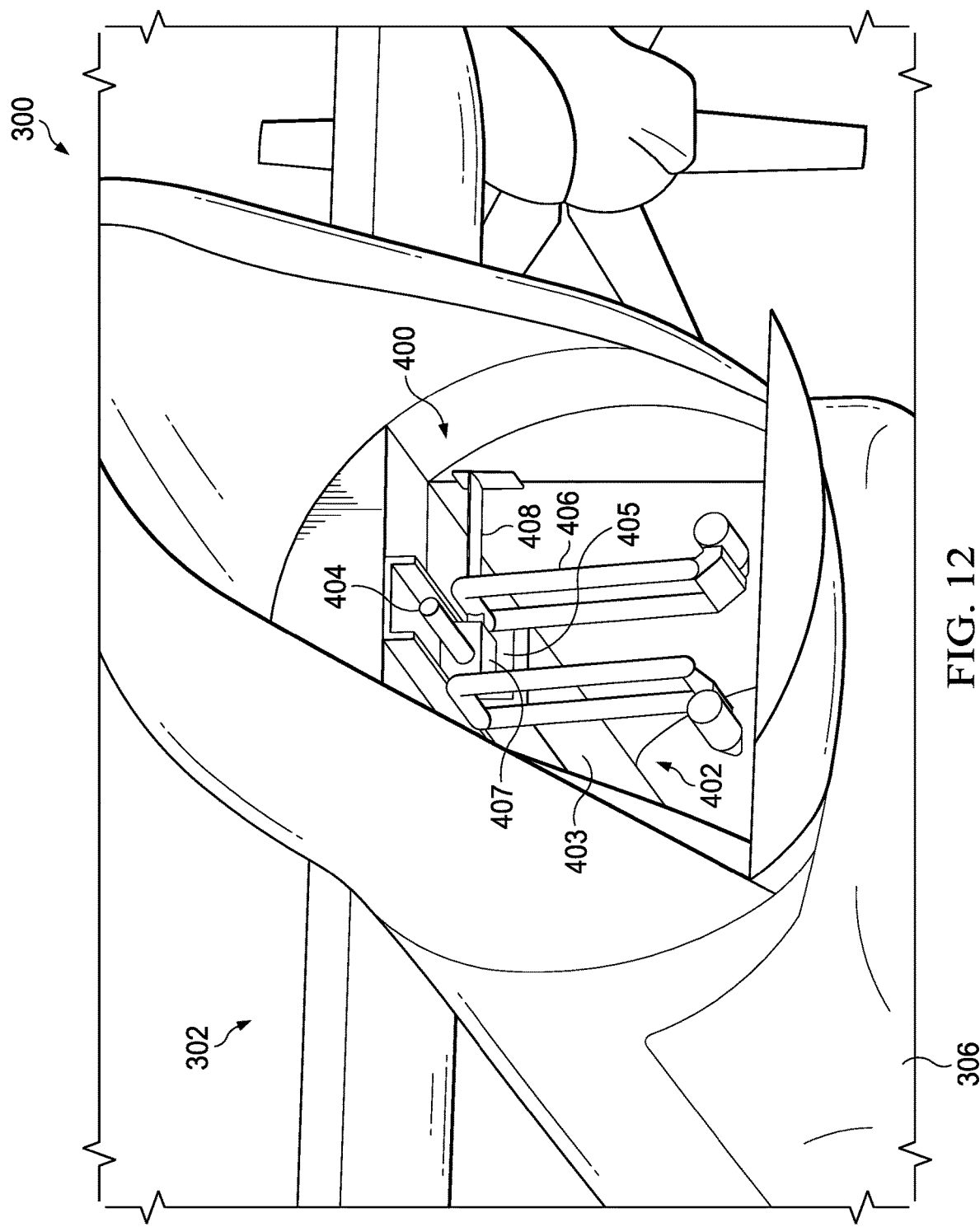
FIG. 12 is an oblique view of an aerial resupply system (ARS) according to this disclosure, with a supply aircraft in a stowed state.

Referring to FIG. 12, the ARS 300 can be utilized to resupply a receive aircraft 304 with fuel and/or ordinances from a supply aircraft 302 by initially navigating the receive aircraft 304 to a position generally higher than the supply aircraft 302 and behind the supply aircraft 302. As shown, the ARS 300 is in a stowed state so that the supply aircraft 302 houses the RBS 400 within the fuselage 306. When the ARS 300 is not being utilized, a rear door 310 of the supply aircraft 302 can remain closed. However, when ARS 300 is to be utilized, the rear door 310 can be opened to allow the RBS 400 to be longitudinally extended out from the fuselage 306. In this embodiment, the RBS 400 is movably carried within the fuselage 306 along a track 312. In this embodiment, the rigid portion 402 is configured to telescopically extend using an outer tube 403 that is movable relative to the track 312 and an intermediate tube 405 the telescopes longitudinally relative to the outer tube 403. A hinged boom portion 407 can be telescoped out of the intermediate tube 405 and is hinged relative to the intermediate tube 405 so that a forward-most portion of the boom portion 407 generally serves as a hinge area relative to a rearward portion of the intermediate tube 405. The flexible conduit 404 can be selectively extended and retracted through the boom portion 407.

Figure 13:
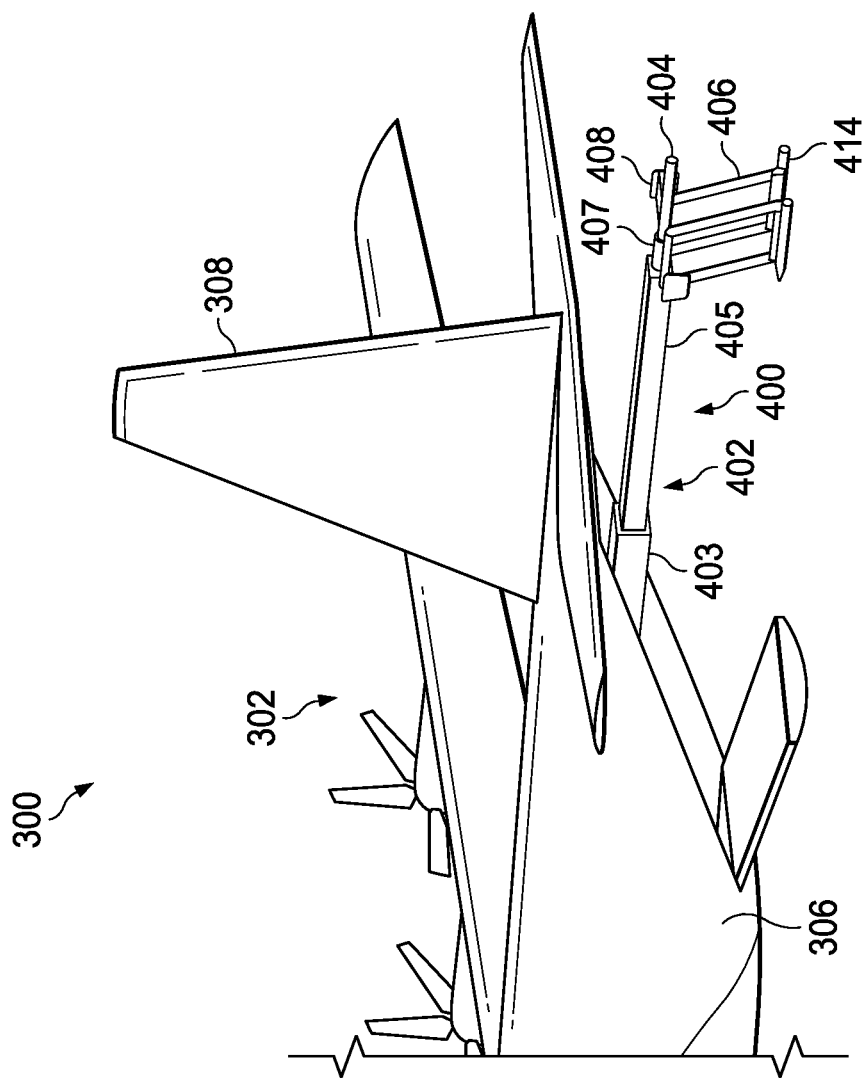
FIG. 13 is a partial oblique view of a supply aircraft of the ARS of FIG. 12 in a deployment state.

Referring to FIG. 13, with the receive aircraft 304 within close proximity of the supply aircraft 302, the RBS 400 may be actuated to extend from the fuselage 306. In this process, rear door 310 is opened to allow removal of the ordinance supply rack 406 from the fuselage 306. First, the RBS 400 may be moved rearward along track 312 until a portion of the outer tube 403 extends beyond the fuselage 306. Next, the intermediate tube 405 may be telescoped outward and away from the fuselage 306 until the wing 408 enters the airstream behind the fuselage 306. Next, the boom portion 407 can be telescoped rearward relative to the intermediate tube 405 until the boom portion 407 is free to rotate relative to the intermediate tube 405. During the above-described extensions, the wing 408 can be actively controlled to minimize all movement of the ordinance supply rack 406 but for the longitudinal extension rearward. Once the boom portion 407 is free to rotate relative to the intermediate tube 405, the wing 408 may be actively controlled to provide lift and raise the ordinance supply rack 406 to a vertical location higher than at least a portion of the tail 308. It is important to note that the wing 408 is coupled relative to the ordinance supply rack 406 so that the wing 408 not only provides desired lift but also maintains a desired and predetermined orientation of the ordinance supply rack 406 relative to the airstream above the fuselage 306 throughout the entirety of the presence of the ordinance supply rack 406 exterior to the fuselage 306.

Figure 14:
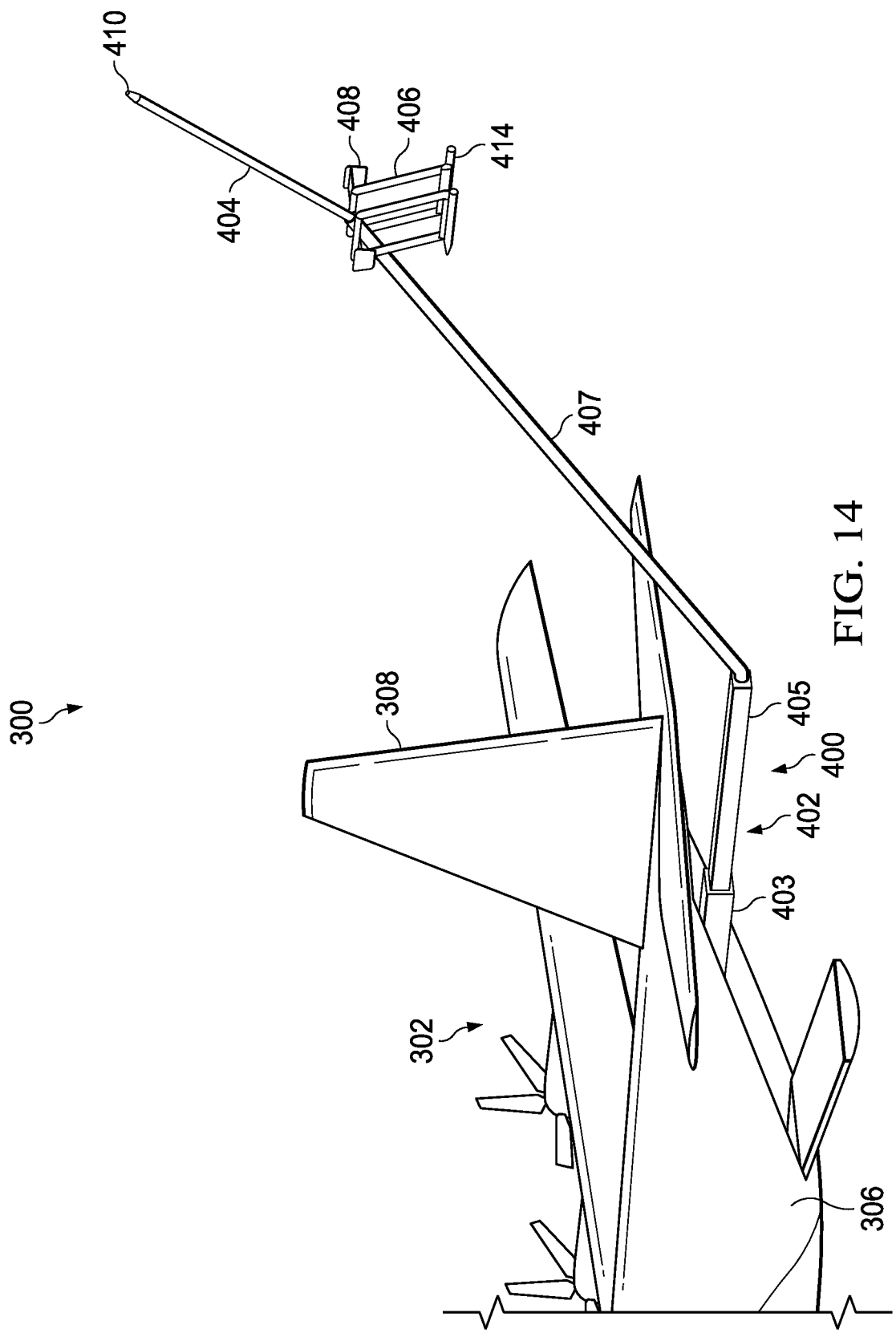
FIG. 14 is a partial oblique view of the supply aircraft of the ARS of FIG. 12 in an extended state.

Referring to FIG. 14, once the rigid portion 202 is rotated away from the fuselage 306, and the ordinance supply rack 406 is fully removed from the fuselage 306, the flexible conduit 404 can be extended from the rigid portion 402.

Figure 15:
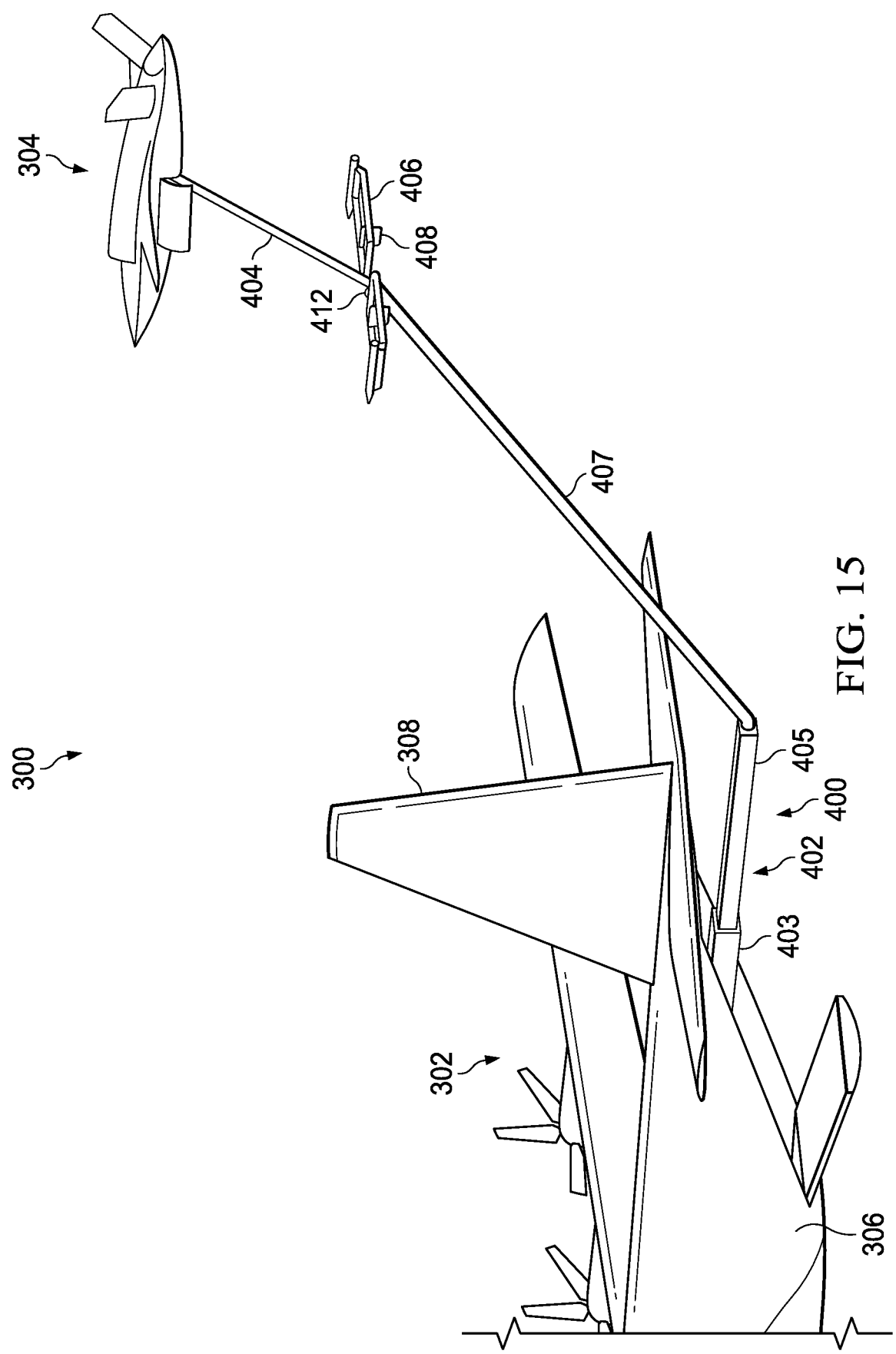
FIG. 15 is a partial oblique view of the ARS of FIG. 12 in a connected state.

Referring to FIG. 15, the receive aircraft 304 can be maneuvered relative to a connector 410 of the flexible conduit 404 so that the connector 410 is received by complementary connector 316 of the receive aircraft 304. In this embodiment, the flexible conduit 404 is configured to make a fluid connection between a fuel supply 318 of the supply aircraft 302 and a fuel receive reservoir 320 of the receive aircraft 304. Additionally, and this embodiment, the flexible conduit 404 carries electrical wiring configured to connect a receive flight control computer (FCC) 322 to at least one of a location sensor 412 carried by the RBS 400 and a FCC 324 of the supply aircraft 302. With the connection between the connector 410 and the complementary connector 316 made, fuel may begin being pumped vertically upward from the fuel supply 318 to the fuel receive reservoir 320. During the above-described fuel transfer, the ordinance supply rack 406 can be actuated from an initial state where the ordinances 414 carried by the ordinance supply rack 406 are at vertical locations that overlap vertical locations of the rigid portion 402 to vertical locations vertically higher than the rigid portion 402.

Figure 16:
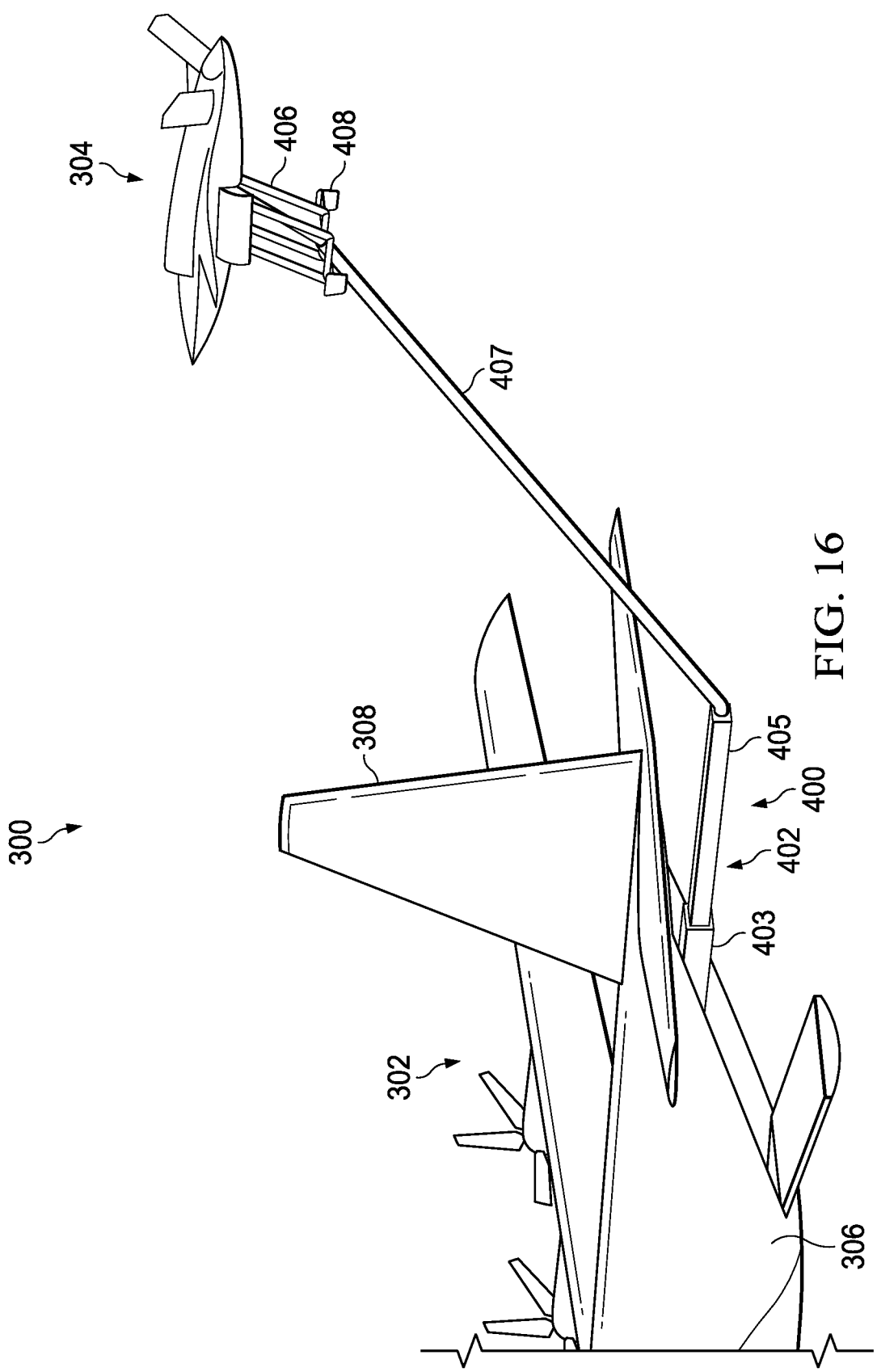
FIG. 16 is a partial oblique view of the ARS of FIG. 12 in an ordinance insertion state.

Referring to FIG. 16, the ordinance supply rack 406 can further be actuated into a pre-positioned state selected to allow insertion of the ordinances 414 and a portion of the ordinance supply rack 406 into a bay 325 of the receive aircraft 304. With the ordinance supply rack 406 in the pre-positioned state described above, relative location data specific to the location of the RBS 400 and the receive aircraft 304 can be provided from the location sensors 412 to the FCC 322 and the FCC 322 can utilize the data to maneuver the receive aircraft 304 closer to the ordinances 414. During such reduction of distance between the ordinances 414 and the receive aircraft 304, unnecessary length in the flexible conduit 404 can be retracted through the rigid portion 402. Ordinances 414 can be transferred from the ordinance supply rack 406 to a complementary rack of the receive aircraft 304. Once the ordinances 414 are received by the complementary rack, they may be secured using pins or other attachment means. In response to verification of a successful transfer of the ordinances 414 and in some cases completed fuel transfer, the connection between the connector 410 and the complementary connector 316 may be discontinued.

Figure 17:
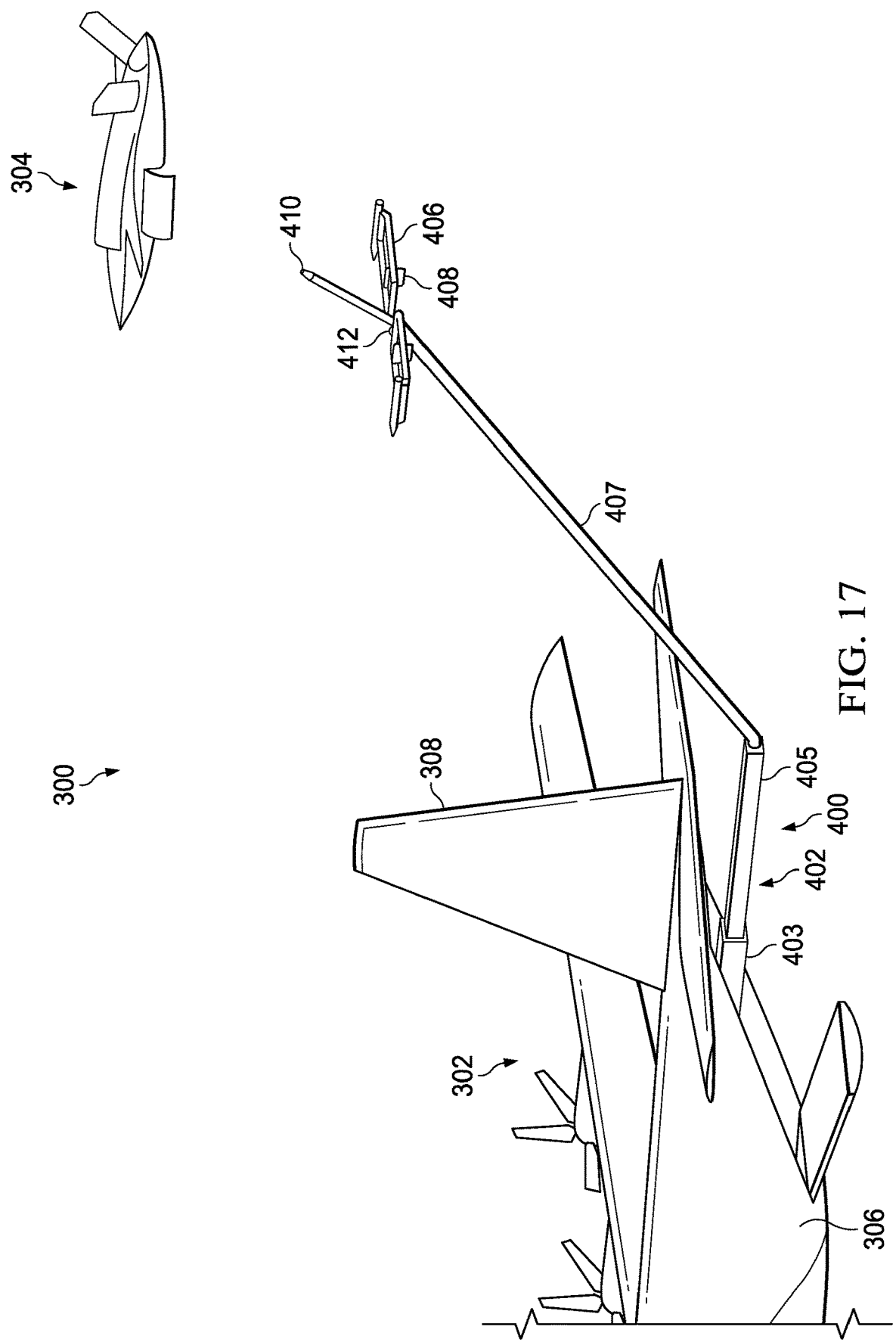
FIG. 17 is a partial oblique view of the ARS of FIG. 12 in a post resupply state.

Referring to FIG. 17, the receive aircraft 304 is shown moving away from the RBS 400 and the ordinance supply rack 406 is shown being actuated from the pre-positioned state toward the state initially shown in FIG. 12 which will allow the ordinance supply rack 406 to be moved back into the fuselage 306. Although not shown, it will be appreciated that stowage of the RBS 400 back into the fuselage 306 can be accomplished by performing the above described RBS 400 deployment steps in reverse so that upon completion, the entirety of the ordinance supply rack 406 is once again received within the fuselage 306 and the rigid portion 402 is once again fully within the fuselage 306. Once re-stowed, the ordinance supply rack 406 can be resupplied with ordinances either manually by crewmembers within the fuselage 306 or by an automated resupply system carried within the fuselage 306.

Figure 18:
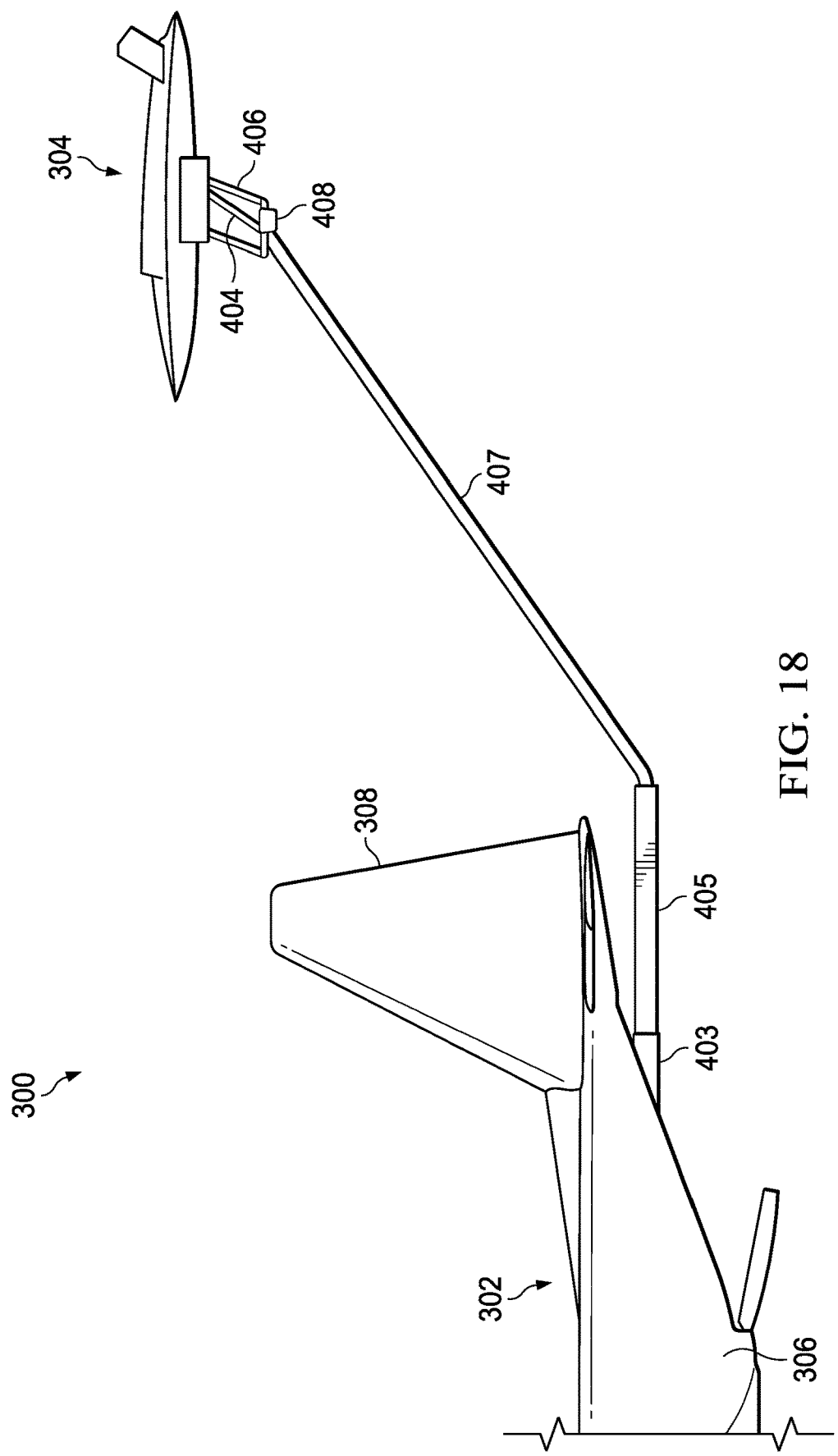
FIG. 18 is a partial side view of the ARS of FIG. 12 in an ordinance insertion state.

Referring to FIG. 18, a side view of the ARS 300 is shown resupplying a receive aircraft 304 with both fuel and ordinances where the receive aircraft 304 is higher than the supply aircraft 302.

Figure 19:
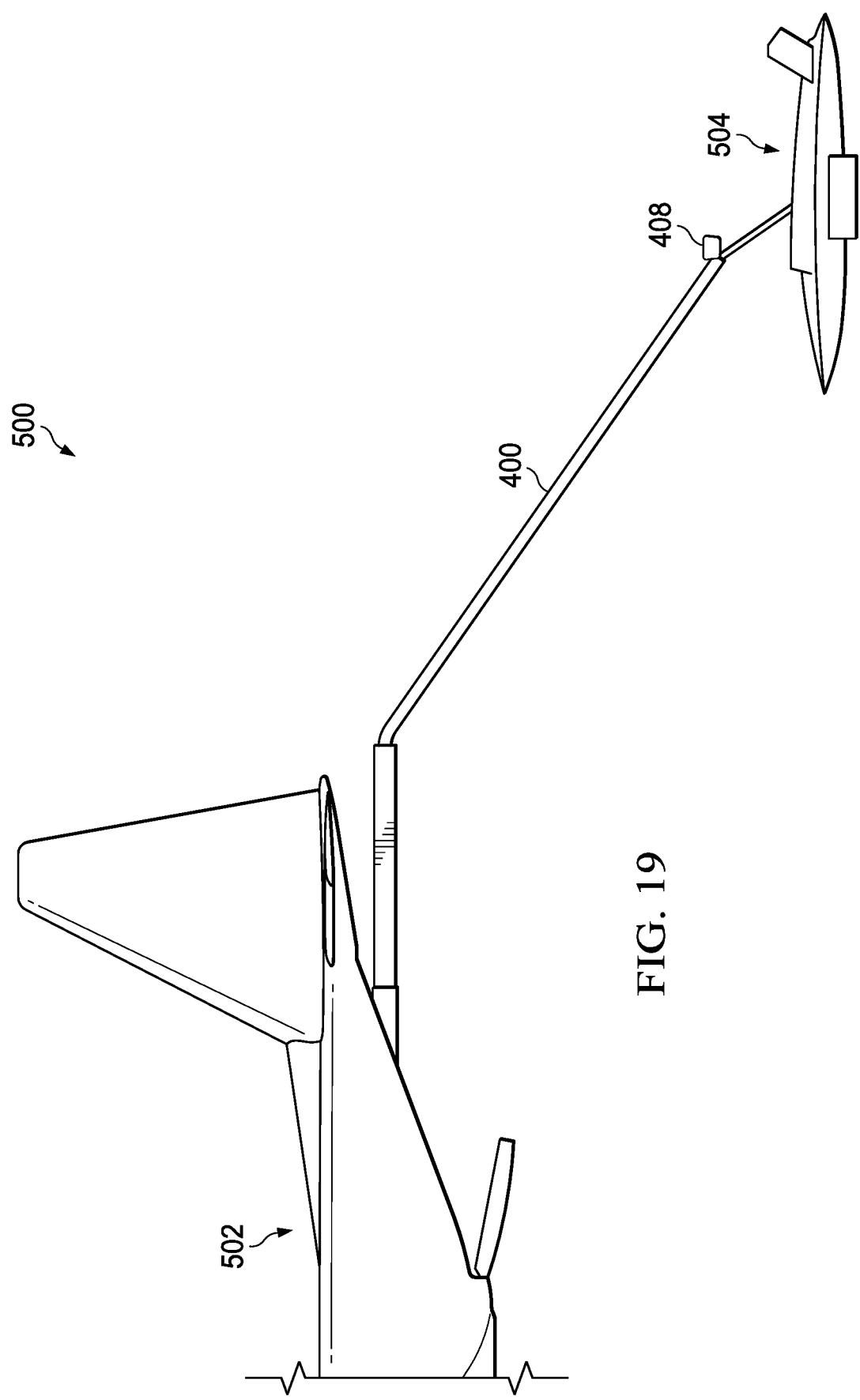
FIG. 19 is a partial side view of another embodiment of an ARS.

Referring to FIG. 19, a side view of an ARS 500 is shown resupplying a receive aircraft 504 with fuel where the receive aircraft 504 is lower than the supply aircraft 502. In this embodiment, no ordinance rack is provided.

Figure 20:
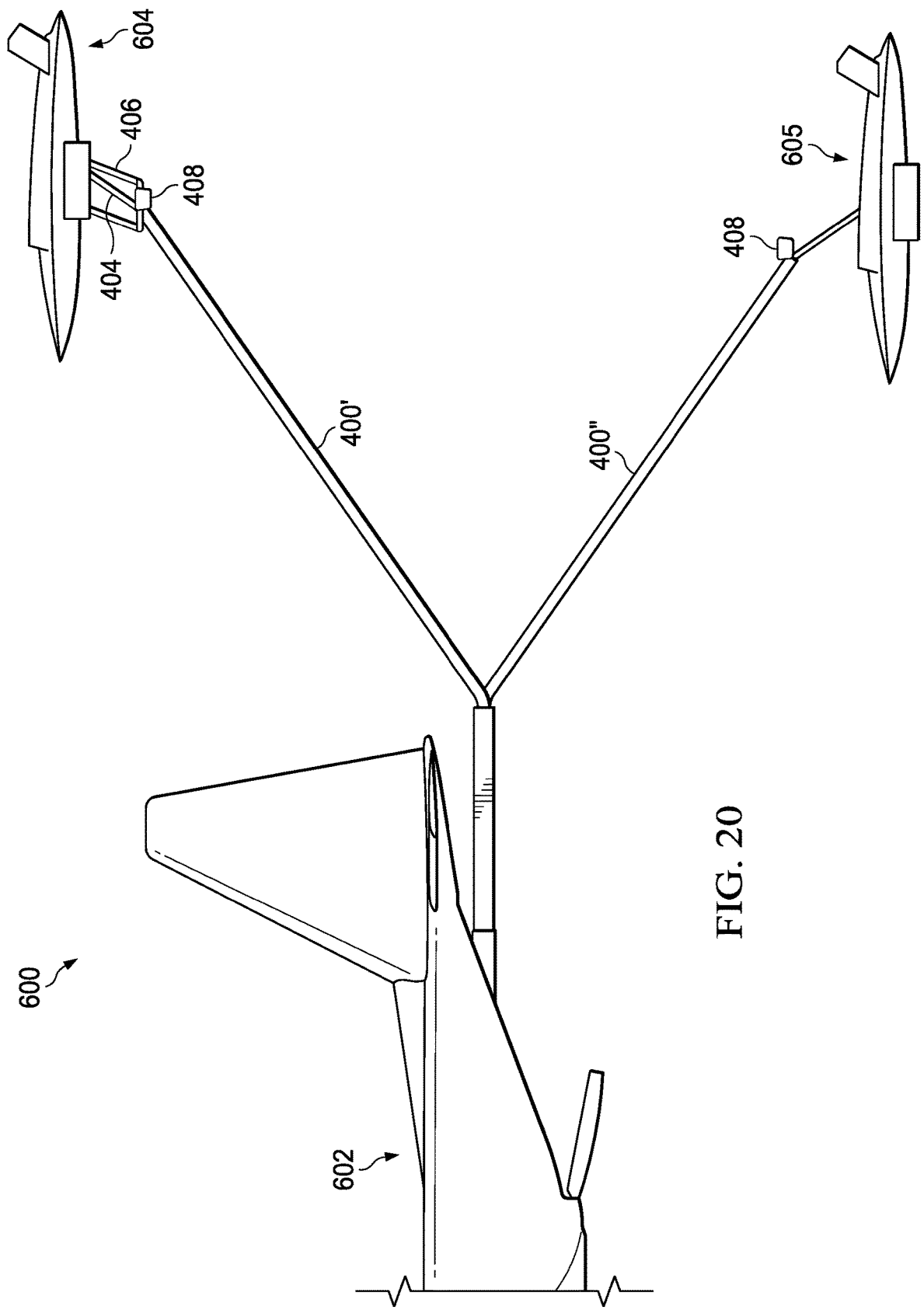
FIG. 20 is a partial side view of another embodiment of an ARS.

Referring to FIG. 20, a side view of an ARS 600 is shown resupplying a first receive aircraft 604 with ordinances and fuel where the first receive aircraft 604 is above the supply aircraft 602 and additionally resupplying a second receive aircraft 605 with fuel where the second receive aircraft 605 is below the supply aircraft 602. In this embodiment, two track systems are provided within the fuselage of the supply aircraft and two telescoping rigid portions are provided, one on each track. In this embodiment, multiple receive aircraft can be serviced simultaneously.

Figure 21:
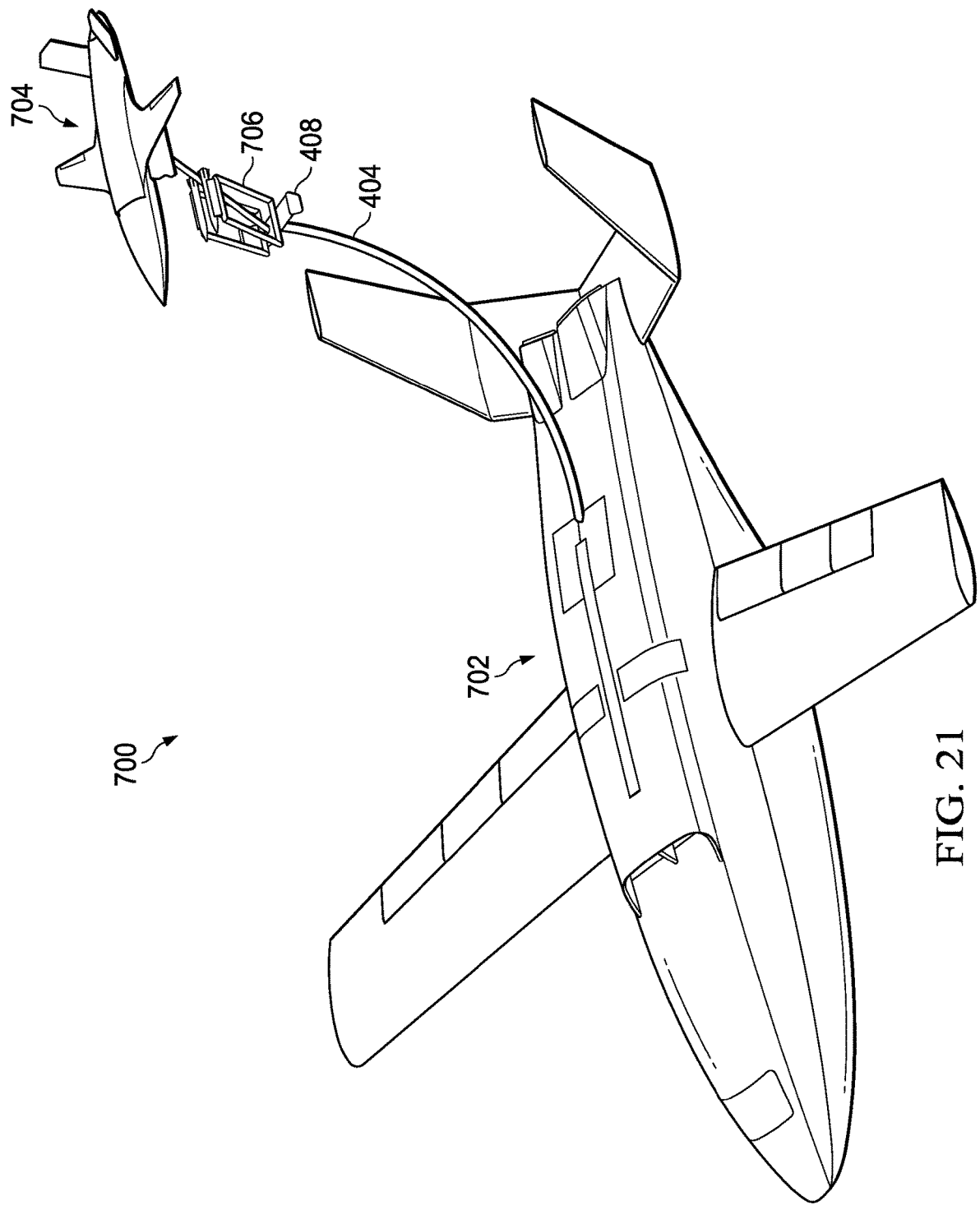
FIG. 21 is an oblique view of another embodiment of an ARS.

Referring to FIG. 21, a side view of an ARS 700 is shown resupplying a receive aircraft 704 with ordinances and fuel where the receive aircraft is higher than the supply aircraft 702. In this embodiment, the ordinance supply rack 706 carries a controllable wing and the ordinance supply rack is carried by flexible conduit rather than a rigid portion.

It will be appreciated that not every embodiment contemplated by this disclosure is shown. For example, it is contemplated that rather than only having the wings shown in the various embodiments, alternative embodiments of ARSs can comprise wings that are placed differently or in addition to the wings shown. In particular, controllable surfaces may be provided on any of the rigid portions, flexible conduits, ordinance supply racks, etc. Similarly, location sensors can be provided on any other portions of an ARS, including anywhere on the RBSs, anywhere on the aircraft, anywhere on the ordinances, etc. Further, the disclosed data link between the sensors and FCCs need not be limited to the explicitly described embodiments, but rather, the sensors, FCCs, smart ordinances, and other aircraft can be configured to communicate in a variety of manners to facilitate the desired maneuvering required to resupply aircraft while in flight. Alternative embodiments of an ARS may not include the above-described sensors and smart maneuverability and may instead rely on more traditional approach and connection techniques to connect the connectors, thereby allowing the ARS to reel in and reel out receive aircraft as needed.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aerial resupply system (ARS), comprising:
   a supply aircraft, comprising:
      at least one of supply fuel, an ordinance, and data;
      a retractable boom system (RBS) configured for selective stowage within a fuselage of the supply aircraft and configured to supply at least one of supply fuel, the ordinance, and data to a location external to the fuselage;
      a rigid portion movable relative to the fuselage and configured for selectively changing an amount of the rigid portion disposed outside the fuselage;
      a flexible conduit at least partially carried by the rigid portion; and
      an ordinance supply rack carried by the rigid portion, the ordinance supply rack comprising a first arm rotatable relative to the rigid portion and a second arm rotatable relative to the rigid portion, wherein the flexible conduit is disposed between the first arm and the second arm;
      wherein a distal end portion of the flexible conduit is configured to be disposed outside the rigid portion when the flexible conduit is pressurized with fuel and wherein the distal end portion is configured to remain flexible when the distal end portion is pressurized with fuel.

2. The ARS of claim 1, the RBS comprising:
   an actuatable wing disposed between at least a portion of the flexible conduit and the fuselage;
   wherein at least a portion of the flexible conduit is disposed within the fuselage.

3. The ARS of claim 2,
   wherein the rigid portion is movable relative to the fuselage and configured for selectively changing an amount of the rigid portion disposed outside the fuselage, wherein the actuatable wing is carried by the rigid portion.

4. The ARS of claim 1,
   wherein the ordinance supply rack is configured to carry the ordinance, and wherein the ordinance supply rack is selectively movable relative to the fuselage.

5. The ARS of claim 4, wherein the ordinance supply rack is movable between a first configuration and a second configuration, wherein moving between the first configuration and the second configuration changes a distance between the ordinance and the fuselage.

6. The ARS of claim 5, wherein the ordinance supply rack comprises at least one of a four bar mechanism and a linear actuator.

7. The ARS of claim 1, wherein the RBS is selectively deployed from the fuselage via a top side of the fuselage.

8. The ARS of claim 1, wherein the RBS is selectively deployed from the fuselage via a rear of the fuselage.

* * * * *